(12) United States Patent
Durkot et al.

(10) Patent No.: US 6,472,103 B1
(45) Date of Patent: Oct. 29, 2002

(54) ZINC-BASED ELECTRODE PARTICLE FORM

(75) Inventors: Richard Edward Durkot, East Walpole; Lifun Lin, Lincoln; Peter Bayard Harris, Stow, all of MA (US)

(73) Assignee: The Gillette Company, Boston, MA (US)

(*) Notice: Subject to any disclaimer, the term of this patent is extended or adjusted under 35 U.S.C. 154(b) by 114 days.

(21) Appl. No.: 09/651,329

(22) Filed: Aug. 30, 2000

Related U.S. Application Data

(63) Continuation of application No. 09/115,867, filed on Jul. 15, 1998, now abandoned, which is a continuation-in-part of application No. 08/905,254, filed on Aug. 1, 1997, now Pat. No. 6,284,410.

(51) Int. Cl.⁷ .............................................. H01M 4/58
(52) U.S. Cl. ................. 429/229; 429/218.1; 252/182.1
(58) Field of Search .............................. 429/229, 218.1, 429/206, 245; 252/182.1

(56) References Cited

U.S. PATENT DOCUMENTS

| | | | |
|---|---|---|---|
| 3,661,645 A | 5/1972 | Strier et al. ................. 136/20 |
| 3,784,506 A | 1/1974 | Vasta ....................... 260/39 R |
| 3,884,722 A | 5/1975 | Tucholski ................. 136/102 |
| 3,923,544 A | 12/1975 | Berchielli ................. 136/30 |
| 3,953,242 A | 4/1976 | Hoffman .................... 136/155 |
| 3,954,506 A | 5/1976 | Sullivan |
| 4,104,188 A | 8/1978 | Nicaise .................... 252/182.1 |
| 4,112,205 A | 9/1978 | Charkoudian et al. ....... 429/199 |
| 4,144,382 A | 3/1979 | Takeda et al. ............... 429/91 |
| 4,175,052 A | 11/1979 | Norteman, Jr. ............. 252/182 |
| 4,195,120 A | 3/1980 | Rossler et al. .............. 429/50 |
| 4,197,635 A | 4/1980 | Bilhorn ...................... 29/623 |
| 4,209,577 A | 6/1980 | Clash ......................... 429/206 |
| 4,242,424 A | 12/1980 | Buckler et al. ............. 429/152 |
| 4,247,606 A | 1/1981 | Uetani et al. ................ 429/91 |
| 4,260,669 A | 4/1981 | Kerg ......................... 429/215 |
| 4,288,913 A | 9/1981 | Parsen et al. ............... 29/623.5 |
| 4,328,297 A | 5/1982 | Bilhorn ..................... 429/222 |
| 4,332,870 A | 6/1982 | Parsen et al. .............. 429/206 |
| 4,361,633 A | 11/1982 | Nel et al. .................. 429/162 |
| 4,372,823 A * | 2/1983 | Church et al. .............. 204/2.1 |
| 4,376,810 A * | 3/1983 | Takeda et al. ............... 429/90 |
| 4,380,578 A | 4/1983 | Bahary ....................... 429/206 |
| 4,404,117 A | 9/1983 | Gugenberger ............. 252/182.1 |
| 4,427,751 A | 1/1984 | Furukawa et al. .......... 429/206 |
| 4,435,488 A | 3/1984 | Bahary et al. .............. 429/212 |
| 4,455,358 A | 6/1984 | Graham et al. ............. 429/190 |
| 4,460,543 A | 7/1984 | Glaeser ..................... 420/513 |
| 4,464,446 A | 8/1984 | Berger et al. .............. 429/190 |
| 4,487,651 A | 12/1984 | Wang ....................... 429/190 |
| 4,500,614 A | 2/1985 | Nagamine et al. .......... 429/206 |
| 4,514,473 A | 4/1985 | Atkin et al. ................. 429/10 |
| 4,548,642 A | 10/1985 | Glaeser |
| 4,563,404 A | 1/1986 | Bahary ...................... 429/206 |
| 4,579,791 A | 4/1986 | Wang ......................... 429/50 |
| 4,585,716 A | 4/1986 | Chalilpoyil et al. ........ 429/206 |
| 4,592,974 A | 6/1986 | Takeda et al. .............. 429/229 |
| 4,604,335 A | 8/1986 | Johnson ..................... 429/197 |
| 4,606,869 A | 8/1986 | Showak |
| 4,619,845 A | 10/1986 | Ayers et al. |
| 4,631,013 A | 12/1986 | Miller |
| 4,632,699 A | 12/1986 | Meeus et al. ............... 75/0.5 B |
| 4,649,093 A | 3/1987 | Vu et al. .................... 429/229 |
| 4,681,698 A | 7/1987 | Graham et al. .......... 252/182.1 |
| 4,722,763 A | 2/1988 | Pa et al. .................. 156/616.1 |
| 4,735,876 A | 4/1988 | Miura et al. ............... 429/206 |
| 4,743,185 A | 5/1988 | Vu et al. ..................... 419/23 |
| 4,778,516 A | 10/1988 | Raman |
| 4,812,374 A | 3/1989 | Kagawa et al. .............. 429/50 |
| 4,861,688 A | 8/1989 | Miura et al. ............... 429/206 |
| 4,920,020 A | 4/1990 | Strauven et al. |
| 4,957,827 A | 9/1990 | Kordesch et al. ............ 429/60 |
| 4,994,333 A | 2/1991 | Jose et al. .................. 429/190 |
| 4,996,129 A | 2/1991 | Tuck .......................... 429/194 |
| 5,082,622 A | 1/1992 | Meeus et al. |
| 5,108,494 A | 4/1992 | Uemura et al. ............... 75/347 |
| 5,139,900 A | 8/1992 | Tada et al. .................. 429/206 |
| 5,147,739 A | 9/1992 | Beard ......................... 429/59 |
| 5,162,169 A | 11/1992 | Tomantschger et al. ...... 429/59 |
| 5,164,274 A | 11/1992 | Kordesch et al. ........... 429/144 |
| 5,168,018 A * | 12/1992 | Yoshizawa et al. ......... 429/190 |
| 5,183,481 A | 2/1993 | Felder |
| 5,198,315 A | 3/1993 | Tada et al. .................. 429/209 |
| 5,206,096 A | 4/1993 | Goldstein et al. ............ 429/27 |
| 5,209,995 A * | 5/1993 | Tada et al. .................. 429/229 |
| 5,228,958 A | 7/1993 | Goldstein et al. ........... 204/115 |

(List continued on next page.)

FOREIGN PATENT DOCUMENTS

| | | |
|---|---|---|
| CA | 2077796 | 9/1992 |
| DE | 23 45 514 A1 | 9/1973 |
| DE | 2347273 | 3/1974 |
| DE | 2441356 | 3/1975 |
| DE | 2364203 | 6/1975 |
| DE | 3605718 A | 8/1987 |

(List continued on next page.)

OTHER PUBLICATIONS

Daniel–Ivad et al., "Mercury and lead free Zn/MnO₂ cells", Extended Abstracts, vol. 95–2, Oct. 1995.

(List continued on next page.)

*Primary Examiner*—Stephen Kalafut
*Assistant Examiner*—R. Alejandro
(74) *Attorney, Agent, or Firm*—Fish & Richardson P.C.

(57) ABSTRACT

A primary electrochemical cell with an anode comprising zinc-based particles suspended in a fluid medium is disclosed. The zinc-based particles include at least about 1 percent, by weight, of fines (particles of –200 mesh size) or dust (particles of –325 mesh size). The zinc-based particles can have a relatively small average particle size. The zinc-based particles can be alloyed with, for example, indium and/or bismuth and be of spherical, acicular or flake shape. The anode can have a low resistivity at low zinc loadings, and the cell can demonstrate good mechanical stability and overall performance.

14 Claims, 5 Drawing Sheets

U.S. PATENT DOCUMENTS

| | | | |
|---|---|---|---|
| 5,232,798 A | 8/1993 | Goldstein et al. | 429/229 |
| 5,240,793 A | 8/1993 | Glaeser | 429/206 |
| 5,278,005 A | 1/1994 | Yamauchi et al. | 429/194 |
| 5,283,139 A | 2/1994 | Newman et al. | 429/224 |
| 5,296,267 A | 3/1994 | Tada et al. | 427/216 |
| 5,312,476 A | 5/1994 | Uemura et al. | 75/347 |
| 5,340,666 A | 8/1994 | Tomantschger et al. | 429/59 |
| 5,346,781 A | 9/1994 | Yuasa et al. | 429/59 |
| 5,348,816 A | 9/1994 | Shinoda et al. | 429/206 |
| 5,368,958 A | 11/1994 | Hirai et al. | 429/211 |
| 5,376,480 A | 12/1994 | Shinoda et al. | 429/206 |
| 5,389,468 A | 2/1995 | Fujiwara et al. | 429/206 |
| 5,419,987 A | 5/1995 | Goldstein et al. | 429/229 |
| 5,424,145 A | 6/1995 | Tomantschger et al. | 429/57 |
| 5,425,798 A | 6/1995 | Sasaki et al. | 75/347 |
| 5,432,031 A | 7/1995 | Teraoka et al. | 429/223 |
| 5,434,023 A | 7/1995 | Teraoka et al. | 429/218 |
| 5,445,908 A | 8/1995 | Inoue et al. | 429/229 |
| 5,482,798 A | 1/1996 | Mototani et al. | 429/224 |
| 5,514,496 A | 5/1996 | Mishima et al. | 429/218 |
| 5,532,087 A | 7/1996 | Nerz et al. | 429/248 |
| 5,541,021 A | 7/1996 | Watanabe et al. | 429/206 |
| 5,587,254 A | 12/1996 | Kojima et al. | 429/206 |
| 5,626,988 A * | 5/1997 | Daniel-Ivad et al. | 429/229 |
| 5,652,043 A | 7/1997 | Nitzan | 428/209 |
| 5,712,060 A | 1/1998 | Grigorieva et al. | 429/206 |
| 5,741,609 A | 4/1998 | Chen et al. | 429/192 |
| 5,750,288 A | 5/1998 | Xie et al. | 429/229 |
| 5,780,186 A | 7/1998 | Casey, Jr. | 429/229 |
| 6,015,636 A | 1/2000 | Goldstein et al. | |
| 6,022,639 A | 2/2000 | Urry | 429/229 |

FOREIGN PATENT DOCUMENTS

| | | |
|---|---|---|
| EP | 0 161 701 | 11/1985 |
| EP | 0 162 411 | 11/1985 |
| EP | 0 328 131 A2 | 8/1989 |
| EP | 0 497 074 A1 | 1/1991 |
| EP | 0 377 106 B1 | 3/1995 |
| EP | 0 762 521 A2 | 12/1997 |
| EP | 0 817 294 A1 | 7/1998 |
| FR | 2 276 699 | 6/1974 |
| JP | 47-43896 | 11/1968 |
| JP | 51 104533 | 9/1976 |
| JP | 46445 | 4/1977 |
| JP | 54-99945 A | 1/1978 |
| JP | 53-41741 A | 4/1978 |
| JP | 53-89811 A | 8/1978 |
| JP | 55-66865 A | 5/1980 |
| JP | 55-117869 | 9/1980 |
| JP | 56-82571 A | 7/1981 |
| JP | 56-145669 | 11/1981 |
| JP | 57-82972 A | 5/1982 |
| JP | 57-182972 | 11/1982 |
| JP | 58-026455 | 2/1983 |
| JP | 83-32744 B | 7/1983 |
| JP | 58-158867 | 9/1983 |
| JP | 58-218760 | 12/1983 |
| JP | 59-66061 | 4/1984 |
| JP | 59-94371 | 5/1984 |
| JP | 59121780 | 7/1984 |
| JP | 59-167961 | 9/1984 |
| JP | 60.32249 | 2/1985 |
| JP | 60.146454 | 2/1985 |
| JP | 60.146455 | 2/1985 |
| JP | 60.146456 | 2/1985 |
| JP | 60.146457 | 2/1985 |
| JP | 60-97581 | 5/1985 |
| JP | 60.97581 | 5/1985 |
| JP | 60.114548 | 6/1985 |
| JP | 60.175364 | 9/1985 |
| JP | 60.175368 | 9/1985 |
| JP | 60.236462 | 11/1985 |
| JP | 60.262352 | 12/1985 |
| JP | 60.262353 | 12/1985 |
| JP | 60.262354 | 12/1985 |
| JP | 61.10861 | 1/1986 |
| JP | 61.19066 | 1/1986 |
| JP | 61.143939 | 1/1986 |
| JP | 61.64974 | 2/1986 |
| JP | 61-49373 | 3/1986 |
| JP | 61.58164 | 3/1986 |
| JP | 61-64974 | 4/1986 |
| JP | 61-77264 | 4/1986 |
| JP | 61.78067 | 4/1986 |
| JP | 61.79789 | 4/1986 |
| JP | 61-131363 | 6/1986 |
| JP | 61 133560 | 6/1986 |
| JP | 61.140066 | 6/1986 |
| JP | 61.140067 | 6/1986 |
| JP | 61.140068 | 6/1986 |
| JP | 61.140464 | 6/1986 |
| JP | 61-193362 | 8/1986 |
| JP | 61-203564 | 9/1986 |
| JP | 61.153948 | 12/1986 |
| JP | 61.153963 | 12/1986 |
| JP | 62-31951 | 2/1987 |
| JP | 62-040162 | 2/1987 |
| JP | 62-105365 A | 5/1987 |
| JP | 62-123658 | 6/1987 |
| JP | 09-235636 | 9/1987 |
| JP | 62-225164 | 10/1987 |
| JP | 63-006747 | 1/1988 |
| JP | 63-195975 | 8/1988 |
| JP | 3-33014 | 2/1991 |
| JP | 30 071559 | 3/1991 |
| JP | 3-272563 | 12/1991 |
| JP | 92-08897 B | 2/1992 |
| JP | 5-101824 | 4/1993 |
| JP | 7-105948 | 4/1995 |
| JP | 60-91562 | 5/1995 |
| RU | 498667 | 1/1974 |
| RU | 399942 | 2/1974 |
| RU | 586516 | 12/1977 |
| RU | 641554 A | 1/1979 |
| WO | WO 91/13924 | 11/1991 |
| WO | WO 98/20569 | 5/1998 |

OTHER PUBLICATIONS

Huot et al., "Elelctrochemical Performance of Gelled Zinc Alloy Powders in Alkaline Solutions", pp. 81–85, Journal of Power Sources, vol. 65, Nos. 1–2, Mar.–Apr. 1997.

Ozbilen et al., "Influence of Liquid Metal Properties on Particle Size of Inert Gas Atomised Powders", pp. 44–52, Power Metallurgy, vol. 39, No. 1, 1996 No month available.

Hani Henein, "Process Diagnostics to Monitor and Control Gas Atomization Operations", pp. 1–199–1–219, Metal Powder Industries Foundation, 1996 No month available.

Boyko et al., "Ensemble Laser Probe Sizing Results for Gas Atomized Zinc Powders", pp. 655–658, First International Conference on Processing Materials for Properties, 1993 No month available.

Ali Unal, "Gas Atomization of Fine Zinc Powders", pp. 11–21, The International Journal of Powder Metallurgy, vol. 26, No. 1, 1990 No month available.

Dunkley et al., "Evaluating the Performance of Atomizers for Producing Metal Powders", pp. 26–31, Industrial Heating, Oct. 1989.

Lavernia et al., "Powder Size and Distribution in Ultrasonic Gas Atomization", pp. 22–26, Journal of Metals, Aug. 1985.

"Gas Atomisation of High Temperature Alloy Powders", pp. 563–566, MPR, Oct. 1983.

J.J. Dunkley, "Properties and Applications of Atomised Metal Powders", pp. 520–525, Assoc. Italiana di Metallurgia, 1982 no month available.

NJZ Metal Powder Data Sheet, Horse Head Zinc Powders, The New Jersey Zinc Company, Inc. Pre–1996 no month available.

Daniel–Ivad et al., "Mercury and lead free Zn/MnO2 cells", Extended Abstracts, vol. 95–2, 1995.

* cited by examiner

ZINC-BASED ELECTRODE PARTICLE FORM

CROSS-REFERENCE TO RELATED APPLICATION

This is a continuation of U.S. Ser. No. 09/115,867, filed Jul. 15, 1998 now abandoned which is a Continuation-in-Part of U.S. Ser. No. 08/905,254, filed Aug. 1, 1997 now U.S. Pat. No. 6,284,410.

BACKGROUND OF THE INVENTION

The present invention relates to improvements in electrochemical cells, particularly cells having negative electrodes comprising zinc-based particles, such as in alkaline batteries.

An electrochemical cell (i.e., a galvanic cell or battery) has the following basic components: a negative electrode (sometimes called an anode), a positive electrode (sometimes called a cathode), and an ion-conductive solution (sometimes called an electrolyte) providing a path for the transfer of charged ions between the two electrodes when they are connected through an external load.

Some alkaline cells have anodes with zinc as an active element, and cathodes with manganese dioxide ($MnO_2$) as an active element. Anodes do not have to be solid; in fact, conventional alkaline cells have a gelled zinc anode mixture. The mixture contains individual zinc-based particles suspended in a thickened liquid or gel containing a gelling agent, an alkaline electrolyte such as potassium hydroxide (KOH), and minor amounts of other additives, such as indium or bismuth (gassing inhibitors for reducing the undesirable tendency for hydrogen gas to build up inside the cell). The zinc-based particles are characterized by a specific size range, commonly indicated by the standard mesh size through which the particles pass. Typically, average anode particle sizes fall in the range of about −50/+200 mesh, indicating particles that pass through a 50 mesh screen and do not pass through a 200 mesh screen (the larger the screen number, the smaller the aperture size of the screen).

Common gelling agents used in anodes include carboxymethycellulose, polyacrylic acid (e.g., Carbopol 940™ from B. F. Goodrich in Brecksville, Ohio, or POLYGEL-4P™ from 3V in Bergamo, Italy), sodium polyacrylate (e.g., CL-15™ from Allied Colloids in Yorkshire, England), and salts. Non-limiting examples of gassing inhibitors include inorganic additives such as indium, bismuth, tin and lead and organic inhibitors such as phosphate esters and anionic and non-ionic surfactants. See U.S. Pat. Nos. 5,283,139, 5,168,018, 4,939,048, 4,500,614, 3,963,520, 4,963,447, 4,455,358, and 4,195,120 for examples of various anode mixtures.

The gel anode is typically separated from the cathode by a separator, such as a thin layer of non-woven material or paper, that prohibits electronic conduction between the anode and the cathode but allows ions to pass between them.

Alkaline $Zn/MnO_2$ cells have been commercially available for over 30 years, during which time their performance characteristics have been incrementally optimized by the industry in an attempt to provide the "longest lasting" battery (i.e., one with the greatest overall capacity, measured in ampere-hours) within the volume constraints imposed by the international size standards (e.g., AAAA, AAA, AA, C, D cylindrical and 9 volt prismatic sizes). The volume within such standard cells, into which the active materials are packed, is more or less fixed. The amount of energy available from any given cell size (which is a function of the total amount of the active elements in the cell) has a theoretical upper limit which is defined by the internal cell volume and the practical densities of the active components that are employed.

In addition to trying to produce the "longest-lasting" battery, battery manufacturers are also trying to increase the maximum instantaneous rate of electrical current that can be generated from a battery under a given load without the battery voltage dropping below a minimum value. The motivation for increasing this "maximum discharge rate" capability includes the ongoing development of electronic products, such as cellular phones, which require high currents from small packages. Some of these new devices automatically test the voltage levels of their batteries, and therefore may cause the premature disposal of batteries which have remaining overall capacity, if the sensed voltage dips excessively during a period of high current draw.

When a high current is being drawn from a battery, the voltage of the battery may drop due to zinc-based particle surface "passivation" or anode polarization which can indicate a localized lack of sufficient hydroxide ions to sustain the chemical reaction of the cell. It is believed that a certain amount of porosity is necessary for the free supply of OH- ions coming from the electrolyte and the free disposal of $Zn(OH)_4^-$, $Zn(OH)_2$ or ZnO reaction products back into the electrolyte. If the zinc-based particles are too densely crowded, or if their surfaces are inaccessible due to accumulation of reaction products, the reaction cannot keep up with the rate of current draw. Batteries with densely packed zinc-based particles in their anodes may perform acceptably with very stable voltage levels while supplying low continuous currents, but drop to very low, unacceptable voltages when a high current is drawn due to zinc crowding (sometimes referred to as "choking" or being "electrolyte starved").

In addition, too little electrolyte can starve the overall chemical reaction of the cell or cause the battery to "dry out", as water from the electrolyte is continuously consumed during discharge. The net reaction inside the cell is:

$$Zn+2MnO_2+H_2O \rightarrow ZnO+2MnOOH.$$

Thus, competing with the desire to pack as much zinc-based material as possible into the available anode volume to increase overall capacity for "long life" is the need to provide a sufficient amount of electrolyte to avoid "choking" during periods of high discharge rate.

SUMMARY OF THE INVENTION

The invention is based upon the discovery that including very small zinc-based particles (i.e., fines or dust) among the zinc-based particles of the anode of an alkaline electrochemical cell can provide good cell performance characteristics, especially those characteristics related to high discharge rate performance.

As used herein, "fines" are particles small enough to pass through a standard 200 mesh screen in a normal sieving operation (i.e., with the sieve shaken by hand). "Dust" consists of particles small enough to pass through a standard 325 mesh screen in a normal sieving operation.

A zinc-based particle can be formed of, for example, zinc or a zinc alloy. Materials that can be alloyed with zinc to form zinc-based particles include gassing inhibitors, such as indium and/or bismuth. Generally, a zinc-based particle formed of a zinc alloy will be mostly zinc. A zinc-based particle can be spun or air blown.

The zinc-based particles can include a plating material, such as indium and/or bismuth.

As used herein, a "zinc-based particle" refers to a singular or primary particle of zinc-based material rather than an agglomeration of more than one particle of zinc-based material. An anode can contain primary particles of zinc-based material and/or agglomerates of primary particles of zinc-based material.

According to one aspect of the invention, a negative electrode for an electrochemical cell contains zinc-based particles suspended in a fluid medium, with at least about 1 percent, by weight, of the zinc-based particles being of −200 mesh size or smaller. Even higher weight percentages (e.g., 6 percent, 10 percent, 25 percent, 50 percent, 80 percent, 90 percent or 100 percent) of zinc-based fines can be preferable.

In some embodiments, the zinc-based particles also include at least about 25 percent, by weight, (e.g., at least about 50 percent, 75 percent, 90 percent or 99 percent) of particles between about 20 and 200 mesh size or larger.

In certain embodiments, it is preferable that a substantial percentage (e.g., 10, 45, 80, 90 or 100 weight percent) of the zinc-based particles are dust (of −325 mesh size or smaller, as defined above). However, in other embodiments, less than 10 weight percent of the zinc-based particles may be of −325 mesh size or smaller (e.g., about 1 weight percent to about 10 weight percent, such as about 6 weight percent).

The negative electrode may include a surfactant. The fluid medium preferably includes both an electrolyte and a thickening agent.

The zinc-based particles can be spherical or nonspherical in shape. Nonspherical particles can be acicular in shape (having a length along a major axis at least two times a length along a minor axis) or of flake form (having a thickness of no more than about 20 percent of their maximum linear dimension).

According to another aspect, a negative electrode mixture for an electrochemical cell contains zinc-based particles suspended in a fluid medium with the zinc-based particles comprising less than about 68 percent (e.g., less than about 64 percent, 60 percent, 55 percent or even 45 percent) of the electrode mixture, by weight. The zinc-based particles include a sufficient proportion of particles of about −200 mesh size or smaller to provide an electrode resistivity of less than about 0.2 ohm-centimeters. Preferably, at least about 1 percent, by weight, of the zinc-based particles are of −200 mesh size (more preferably, of −325 mesh size) or smaller.

According to another aspect, the invention features a primary electrochemical cell having a cathode, an anode with zinc-based particles suspended in a fluid medium, at least 1 percent, by weight, of the zinc-based particles being of −200 mesh size or smaller, and a separator between the cathode and the anode.

The anode of the electrochemical cell may include other features, such as zinc-based particle sizes, mentioned above.

According to a further aspect, a negative electrode slurry for an electrochemical cell contains zinc-based particles suspended in a fluid medium including an electrolyte. The slurry has a resistivity of less than about 0.2 ohm-centimeters and the zinc-based particles comprise less than about 68 percent, by weight, of the slurry. The slurry can contain less than about 64 percent, 60 percent, 55 percent or even 45 percent, by weight, zinc-based particles.

According to another aspect of the invention, a method of generating an electric current includes accumulating ions on the surface of zinc-based particles suspended in a fluid medium containing an electrolyte, at least about 1 percent, by weight, of the zinc-based particles being of −200 mesh size or smaller.

In one aspect, the invention features a composition that includes a fluid medium and zinc-based particles contained in the fluid medium. The zinc-based particles have an average particle size of less than about 175 microns.

In another aspect, the invention features a battery that includes an anode, a cathode, and a separator disposed between the anode and the cathode. The anode includes a fluid medium and zinc-based particles contained in the fluid medium. The zinc-based particles have an average particle size of less than about 175 microns.

In a further aspect, the invention features a battery that includes an anode, a cathode, and a separator disposed between the anode and the cathode. The anode includes an active material in the form of zinc-based particles. All the zinc-based particles are of −200 mesh size or smaller.

Cells constructed according to the invention have displayed high tolerance for mechanical shock. They have also demonstrated high running voltages at high rate drains, low internal impedances under load, and good overall performance under various pulsed rate discharge loads.

In addition, the high proportion of zinc-based fines or dust can enable the total amount of zinc to be reduced (i.e., the cell can have a lower zinc "loading") while maintaining overall capacity on practical drains and without the typical loss in mechanical stability normally associated with a reduction in zinc loading. This is believed to be due, in part, to a high efficiency of zinc usage and good particle-to-particle connectivity.

By reducing the total zinc loading needed to achieve a given performance level, water and alkaline electrolyte can be added which may reduce the risk of anode choking.

In some embodiments, it is desirable for the anode to have a relatively low resistivity. In these embodiments, the anode can have a resistivity of about 0.2 ohm-centimeters or less.

Other advantages and features will become apparent from the following description and claims.

DESCRIPTION OF THE PREFERRED EMBODIMENTS

Figure 1:
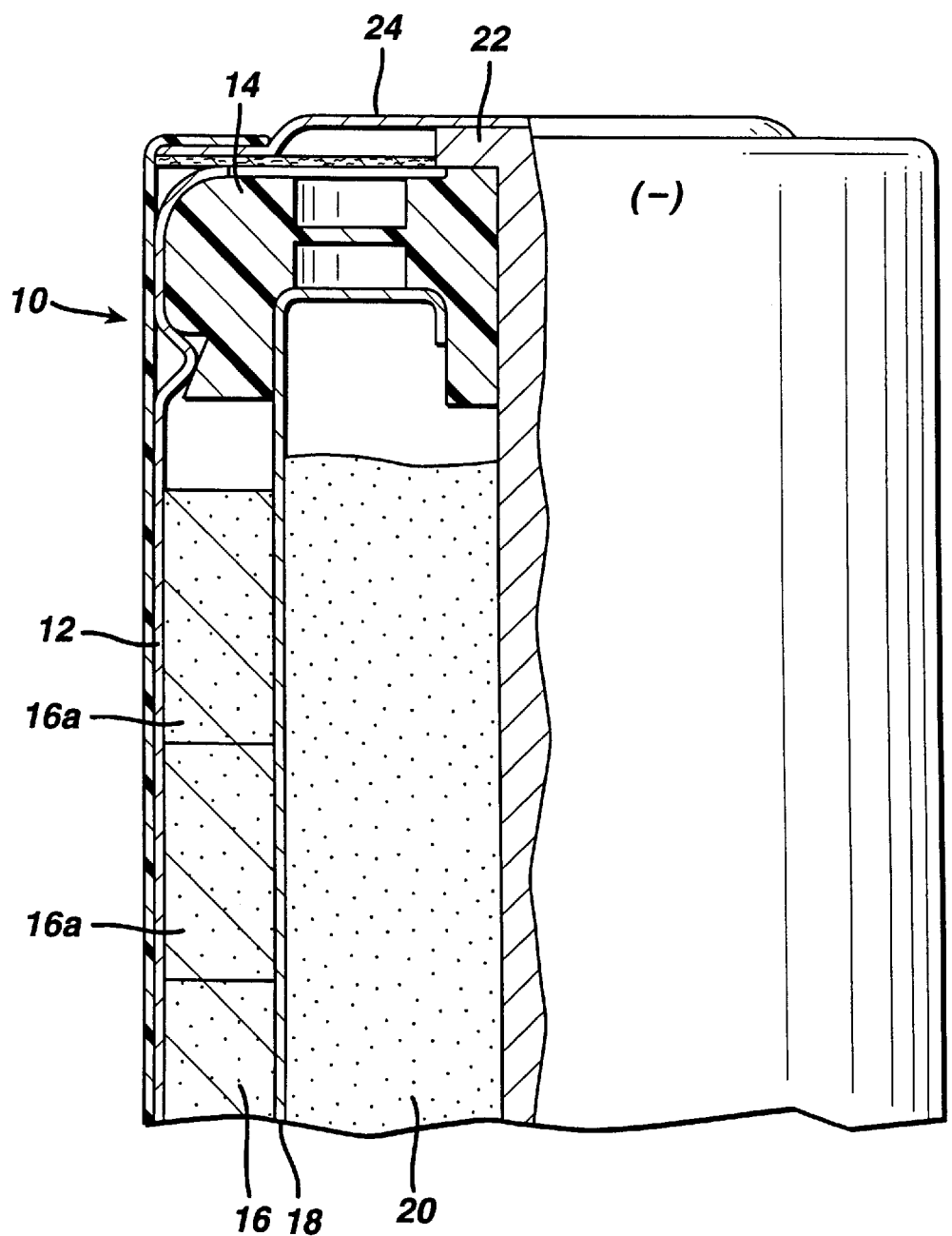
FIG. 1 is a cross sectional view through an alkaline cell.

Referring to FIG. 1, cylindrical cell 10 has a casing 12 closed at its open end by seal member 14 being crimped in place. The cathode 16 is an annular structure with an outer surface in electrical contact with the inner surface of the casing, which serves as the positive external terminal of the cell. Cathode 16 is formed by stacking multiple cathode pellets 16a, as shown. Each cathode pellet is made from a mixture of $MnO_2$, a conductive agent, and electrolyte. Alternatively, the cathode may be formed directly in the casing by pressure compaction, without stacking individual pellets.

A separator 18 lines the inner surfaces of annular cathode 16 and electronically separates the cathode from the anode 20. Separator 18 can be any of a number of well known separator materials, such as cellulose or rayon.

Anode 20 is of gel form, having a desired amount of zinc-based material, in particulate form, suspended in a mixture of alkaline electrolyte and a gelling agent. Gassing inhibitors, such as those described above, are preferably added to the anode gel or as a coating on the zinc-based particles. Generally, the zinc-based particles and alkaline electrolyte together make up about 96%, and more preferably about 98%, by weight, of the anode.

Anode collector 22 passes through seal member 14 and extends into anode 20. The upper end of anode collector 22 electrically contacts a negative end cap 24, which serves as the negative external terminal of the cell. Upon assembly, additional liquid alkaline electrolyte is added to the cell and becomes distributed throughout the anode, cathode, and separator.

The zinc-based particles in anode 20 can include as little as 1% by weight to 10% by weight of fines. Alternatively, the zinc-based particles in anode 20 can include at least 10% by weight, preferably at least 50% by weight, and more preferably at least 80% by weight. In some embodiments, 100% by weight of the zinc-based particles in anode 20 can be fines. High performance has also been noticed, as described more fully below, when there is a significant proportion of zinc-based particles in the form of dust in the anode.

The average size of the zinc-based particles can be relatively small. Preferably, the zinc-based particles have an average size of less than about 175 microns, more preferably less than about 150 microns, and most preferably less than about 120 microns. The manner in which the average particle size of the zinc-based particles is determined is discussed below.

The desired distribution of particle sizes can be produced by several processes. For instance, standard mesh sieves can be employed to sort zinc-based particles produced by centrifugal atomization, gas atomization, or any other known method. Once sorted, by sieving or air classification, for instance, various size ranges of particles can be mixed in proper proportions to produce the desired size distribution. Alternatively, the average size of the particles, as produced, can be controlled, along with the distribution of particle sizes about an average, to produce a statistical distribution having a significant proportion of fines and dust. Once formed, the particles can be mixed with surfactants, gassing inhibitors, gelling agents, electrolyte and other additives by standard processes.

Figure 2:
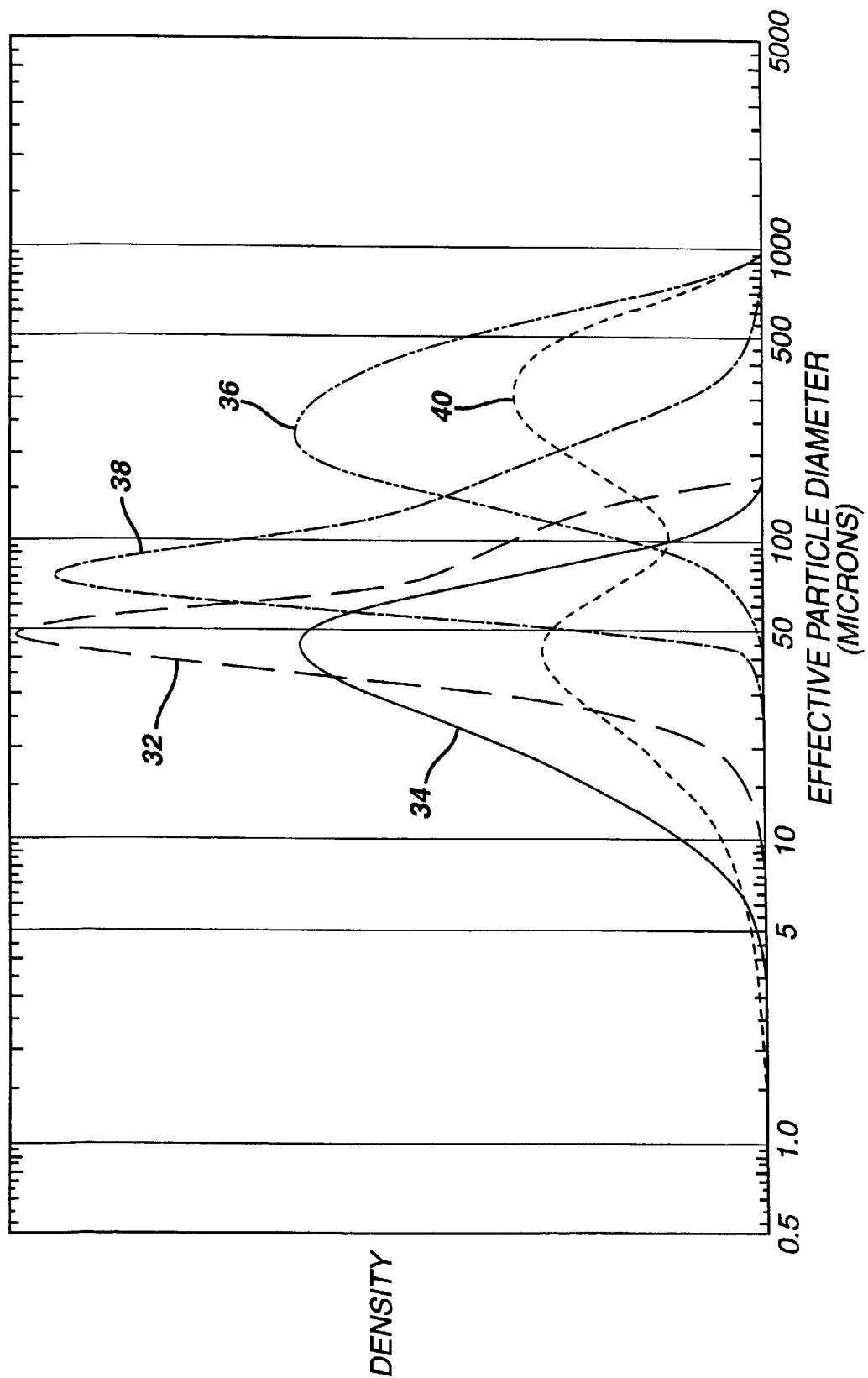
FIG. 2 illustrates zinc-based particle size distributions.

FIG. 2 illustrates some of the distributions of zinc-based particles that have been tested in anode 20. The distributions are shown as a function of effective particle diameter as measured with the particle diameter measurement technique described below. As a rough correspondence between mesh sizes and effective particle diameters, it should be noted that spherical particles with a diameter of 74 microns, for instance, will just sift through a 200 mesh screen, and spherical particles with a diameter of 44 microns will just sift through a 325 mesh screen. This correspondence is less accurate for particles of other shapes. Distribution 32 is of centrifugally atomized zinc-based particles that were sifted through a 325 mesh screen (i.e., dust), and has a peak at an effective particle diameter of about 57 microns. Distribution 34 is of gas atomized particles. Distributions 36 and 38 are of centrifugally atomized particles of −20/+200 and −200 mesh size, respectively. Distribution 40 is a combination of 50%, by weight, of the zinc-based dust of distribution 34 and 50%, by weight, of the particles of distribution 36.

One of the effects of including significant proportions of very small zinc-based particles is an increase in the bulk surface area (i.e., the aggregate surface area) of the zinc-based particles in the anode. This is due to the inherent relationship between particle surface area and volume: namely that, for particles of similar shape, decreasing the particle size increases the surface area to volume ratio of the particle. High bulk surface area for a given particle mass is offered as a possible explanation of some of the high performance demonstrated by batteries with zinc-based particles in the form of fines.

Figure 3:
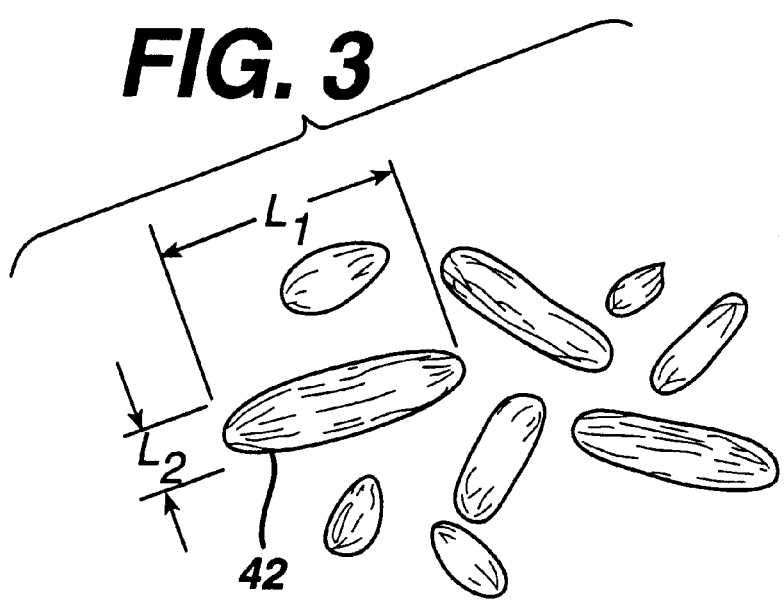
FIG. 3 shows acicular particles.
Figure 4:
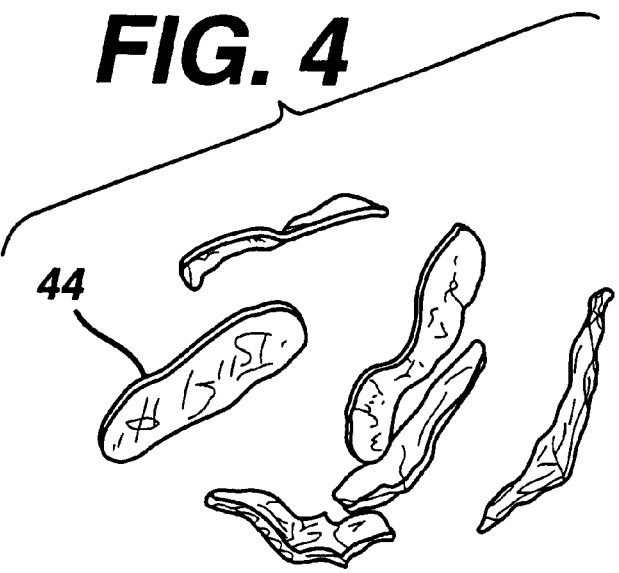
FIG. 4 shows flake particles.

Particle surface area can be further enhanced by controlling the production or subsequent processing of the zinc-based particles to produce particles with extended, non-spherical shapes, such as flakes or acicular particles. Acicular shapes (see particle 42 in FIG. 3, for instance) having a length $L_1$ along a major axis at least two times a length $L_2$ along a minor axis are considered to be appropriate. Flakes, such as particle 44 in FIG. 4, have a thin cross-section and two broad, opposite sides (such as a wafer or potato chip). Preferably, such a flake-form particle has an average thickness between its broad sides of no more than about 20% of the maximum dimension of the particle, to have a very low volume to surface area ratio.

Figure 5:
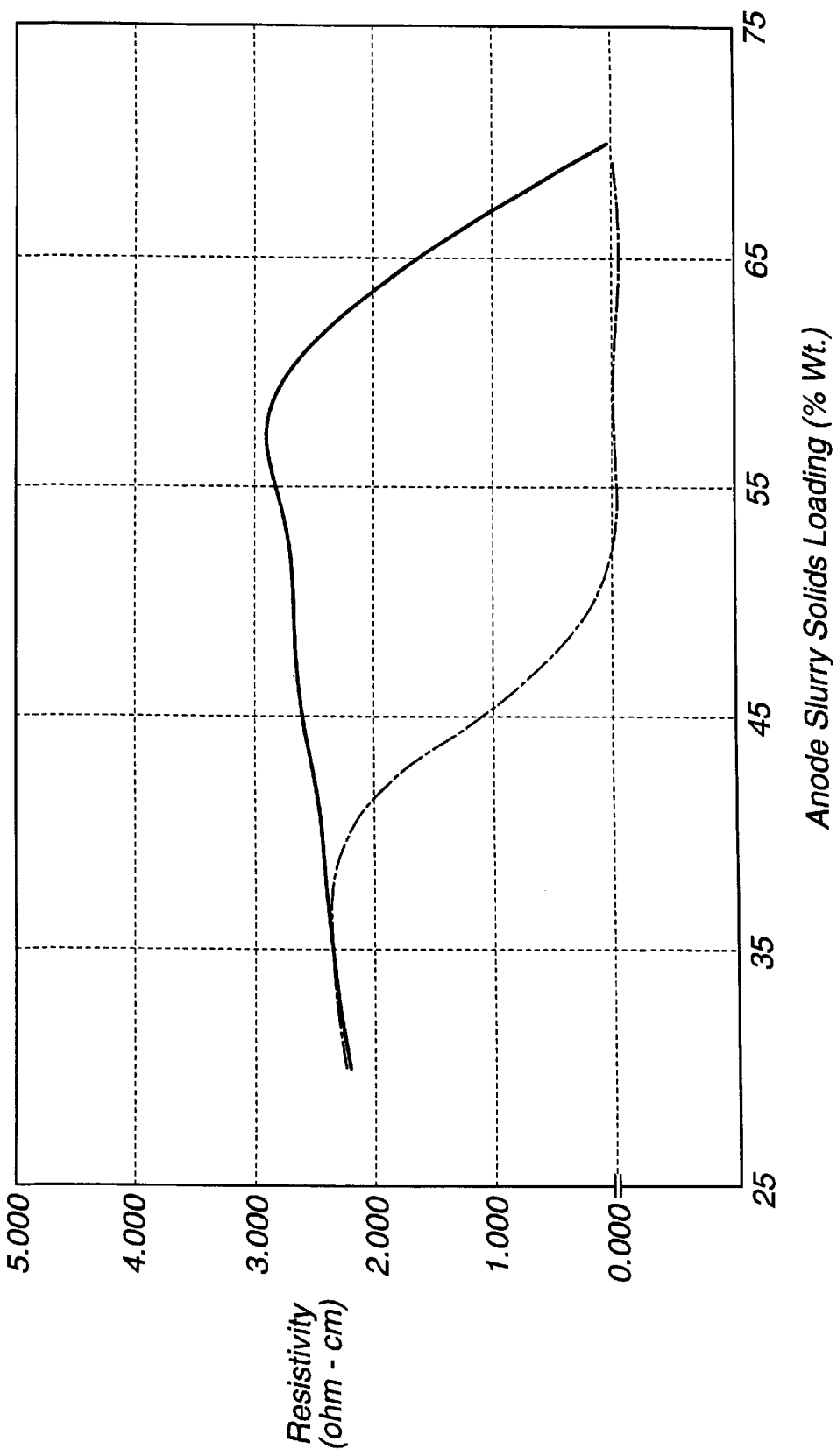
FIG. 5 shows the effect of anode solids loading on anode resistivity using different zinc-based particle size distributions.

One plausible theory for the mechanism that results in the good performance characteristics of batteries with anodes having high proportions of zinc-based dust or fines concerns particle-to-particle connectivity. This theory is only offered as a possible explanation of the observed results, and is not intended to limit the scope of the invention. In effect, it is believed that the additional fines form a mechanical network, particularly under electrical load and at low zinc loadings. This theory is supported by slurry resistivity measurements taken at various zinc loadings, as plotted in FIG. 5. In this figure, the solid line is of an anode mixture with zinc-based particles of −20/+200 mesh size and the dashed line is of an anode mixture with zinc-based particles of −200 mesh size. It is believed that improved connectivity between large particles, fines and dust results in higher conductivity at loadings down to 50% or less. As a result, more electrolyte may be added to the mixture to increase zinc utilization (i.e., increase zinc volumetric usage efficiency) while maintaining low anode resistance. This improvement in connectivity, if the above theory is correct, would also tend to account for the high slurry viscosity, as well as good tolerance for mechanical shock (e.g., tap load voltage stability and drop voltage stability, as described below) of anodes with high proportions of fines and dust.

Continuous Load Test

This test simulates constant discharge in medium current draw applications, such as in some toys. A constant load (e.g., 30 ohms for a AAAA battery and 3.9 ohms for a AA battery) is applied across the battery terminals and the battery is continuously discharged through the load. The amount of time from the application of the load to when the battery voltage drops to a cut-off voltage is recorded.

Continuous Load Test

In this test power is discharged from the battery at a constant rate of (e.g., 0.25 watts for a AAAA battery or one watt for a AA battery), with the load automatically adjusted to account for changing battery voltage. This test is generally considered to be a more strenuous test than a continuous load (i.e., resistance) test, especially toward the end of the test as the battery voltage nears the cutoff value. The amount of time from the application of the load to when the battery voltage drops to a cut-off voltage is recorded.

Pulse Impedance Test

This test is a measure of the maximum dip in voltage that occurs when a fixed load is rapidly applied to the cell, and is an indication of the lag between voltage and current that can be exacerbated by the use of organic corrosion inhibitors to reduce gassing. Though of short duration, instantaneous drops in voltage can have significant consequences, as in devices which monitor instantaneous battery voltage and signal that the battery should be replaced if a low voltage is measured. A 3.9 ohm load is applied to the cell through a fast-acting relay, and the cell voltage is monitored on an oscilloscope. The load is maintained for 400 milliseconds. The minimum voltage during the test, which occurs upon application of the load, is measured.

High Current Pulse Test

AA battery

This test was designed to simulate the performance of a battery in a camera application. A controlled 1.1 amp current is intermittently drawn from the AA battery in a series of pulses, each of 10 seconds duration with a 50 second pause in between each pulse. The pulse series is continued for one hour each day until the AA battery voltage drops to a predetermined cut-off level, at which point the total number of pulses is recorded. This test is also performed on AA cells that have been stored for two weeks at 55° C. to determine how storage at elevated temperatures affects high discharge rate performance.

AAAA battery

This test was designed to simulate the performance of a flashlight. A 5.1 ohm resistance was intermittently applied to a AAAA battery in a series of pulses. The resistance was applied for four minutes per hour for eight hours in each day of service life until the AAAA battery voltage drops to a predetermined cut-off level, at which point the number of total service hours is recorded.

Anode AC Bulk Resistivity

This test measures how well the anode performs as an electrical conductor. A small alternating current, oscillating at about 1000 Hz, is applied to a volume of prepared anode mixture (with proper proportions of zinc-based particles, gelling agent, electrolyte and additives for use in an electrochemical cell), and the bulk resistivity of the mixture is measured.

Tap Load Voltage Instability

This test is a measure of the mechanical stability of the anode during a physical bump or shock. It is common for the voltage of batteries to dip under load during a bump (such as when they are tapped against a hard surface). This test measures the magnitude of such undesirable voltage dips. A constant 3.9 ohm load is applied to the battery, and the battery is struck once with an automated hammer (with a force of about 50–60 pounds, inducing an effective peak acceleration of about 20–50 kilometers/second/second with high attenuation) once every 60 seconds, while monitoring the battery voltage. Generally, when the battery reaches about a 25 percent discharge, the magnitude of the voltage dips reaches a maximum value, decreasing as the battery continues to discharge. The severity of the maximum voltage drop is used as a measure of cell performance.

Particle Diameter Measurement

The data in FIG. 2 were generated by analyzing dry zinc-based particles, in bulk. A representative amount of sample powder to be analyzed was transferred into the funnel of a RODOS-VIBRI™ Sample Dispersion unit, available from Sympatec, which dispersed the powder into a stream of air to form an aerosol. The aerosol of the zinc-based particles in the form of powder is then passed through a HELOS™ Particle Size Analyzer, also available from Sympatec, which measures the intensity and distribution of light diffused through the aerosol of spinning particles. Various optical lenses with different focal lengths are used, in accordance with manufacturer's recommendations, with particles of different size ranges.

For a given sample of zinc-based particles, the average particle size is calculated using the following equation:

$$\text{Average particle size} = \frac{\sum d^4}{\sum d^3}$$

where d represents the diameter of a given zinc-based particle.

EXAMPLE 1

Cylindrical alkaline batteries of Type AA were built with gel anodes having the following two compositions to test the effect of zinc-based particles in the form of fines (the composition values listed are in percent by weight):

| Composition | 1A | 1B |
|---|---|---|
| Zinc alloy particles | 67.97 | 67.97 |
| Indium acetate (42% Indium) | 0.03 | 0.03 |
| Phosphate ester (6% concentration) | 0.06 | 0.06 |
| Polyacrylic acid | 0.53 | 0.53 |
| Sodium polyacrylate | 0.38 | 0.38 |
| Acetic acid (2.5% concentration) | 0.09 | 0.09 |
| Electrolyte solution (2% ZnO, 35% KOH) | 30.94 | 30.94 |
| Total: | 100.00 | 100.00 |
| Particle sieve size | −20/+200 | −200 |
| Average particle size | 335 microns | 86 microns |

The above compositions were prepared by first mixing the indium acetate powder with the dry zinc alloy particles. Next, the acetic acid and phosphate ester were applied, followed by the polyacrylic acid and sodium polyacrylate. After blending and crushing any lumps, the electrolyte solution was added and the mixture was blended until uniform. The zinc alloy particles in both 1A and 1B included 150 ppm In and 200 ppm Bi.

In each of the following tests, four individual batteries were tested.

| Example 1 test results: | 1A | 1B |
|---|---|---|
| Continuous 3.9 ohm load test | | |
| Hours to 1.0 volts | 1.51 | 1.57 |
| Hours to 0.9 volts | 1.70 | 1.86 |
| Hours to 0.8 volts | 1.73 | 2.01 |
| One watt continuous load test | | |
| Hours to 1.0 volts | 0.58 | 0.51 |
| Hours to 0.9 volts | 0.74 | 0.66 |
| Hours to 0.8 volts | 0.84 | 0.77 |

-continued

Figure 6A:
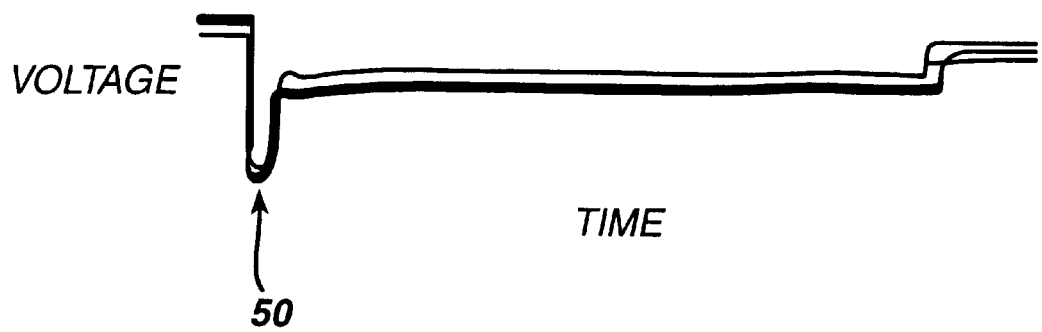
FIGS. 6A and 6B show battery voltage traces taken during pulse impedance tests of the cells of Example 1.
Figure 6B:
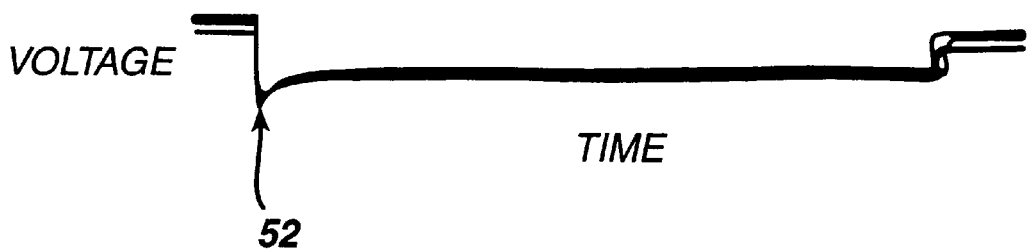

| Example 1 test results: | 1A | 1B |
|---|---|---|
| High current pulse test | | |
| Pulses to 1.0 volts | 174 | 221 |
| Pulses to 0.9 volts | 233 | 337 |
| Pulses to 0.8 volts | 306 | 421 |
| Pulse impedance test | | |
| Actual voltage trace | FIG. 6A | FIG. 6B |

Note that in the pulse impedance tests the peak voltage dip 50 of build 1A (FIG. 6A) is much more pronounced than the voltage dip 52 of build 1B (FIG. 6B).

EXAMPLE 2

Cylindrical alkaline batteries of Type AA were built with gel anodes having the following two compositions (the composition values listed are in percent by weight):

| Composition | 2A | 2B | 2C |
|---|---|---|---|
| Zinc alloy particles | 69.80[1] | 69.80[2] | 69.80[3] |
| Indium acetate (42% Indium) | 0.04 | 0.04 | 0.04 |
| Phosphate ester (6% concentration) | 0.06 | 0.06 | 0.06 |
| Polyacrylic acid (Carbopol 940) | 0.51 | 0.45 | 0.45 |
| Acetic acid (2.5% concentration) | 1.12 | 1.12 | 1.12 |
| Electrolyte solution (2% ZnO, 35% KOH) | 28.47 | 28.53 | 28.53 |
| Total: | 100.00 | 100.00 | 100.00 |

[1]Alloy includes 150 ppm In, 200 ppm Bi; particles sieved to −20/+200 mesh size (average particle size of 354 micron; distribution 36, FIG. 2)
[2]Alloy includes 150 ppm In, 200 ppm Bi; particles sieved to −325 mesh size (average particle size of 57 micron; distribution 32, FIG. 2).
[3]An equal mixture, by weight, of particles as in build 2A and gas atomized zinc particles alloyed with 500 ppm In and 500 ppm Bi. The gas atomized particles had a average particle size of about 41 micron (distribution 34, FIG. 2). The particle mixture corresponds to distribution 40. The average particle size of the mixture was 184 microns.

For each of the following tests, at least four individual batteries of each composition were tested. The results of the individual batteries are averaged.

| Example 2 test results: | 2A | 2B | 2C |
|---|---|---|---|
| High current pulse test to 1.0 V | | | |
| Pulses as built | 226 | 293 | 299 |
| Pulses after storage | 217 | 278 | 244 |
| Tap load voltage instability (max voltage drop, mV) | 374 | 112 | 71 |

EXAMPLE 3

Cylindrical alkaline batteries of Type AA were built with gel anodes having the following two compositions to test the effect of zinc-based particles in the form of fines (the composition values listed are in percent by weight):

| Composition | 3A | 3B |
|---|---|---|
| Zinc alloy particles | 70.00 | 70.00 |
| Indium acetate (42% Indium) | 0.03 | 0.03 |
| Phosphate ester (6% concentration) | 0.06 | 0.06 |
| Polyacrylic acid (Carbopol 940) | 0.51 | 0.48 |
| Acetic acid (2% concentration) | 0.11 | 0.11 |
| Electrolyte solution (2% ZnO, 35% KOH) | 29.29 | 29.32 |
| Total: | 100.00 | 100.00 |
| Average particle size | 298 microns | 112 microns |

The above compositions were prepared by first mixing the indium acetate powder with the dry zinc alloy particles. The electrolyte solution was mixed with the polyacrylic acid to form a gel. After blending and crushing any lumps, the gel was added to the indium acetate/zinc alloy combination and the resulting mixture was blended until uniform.

The zinc alloy in 3A included 150 ppm In and 200 ppm Bi.

3B was a mixture of 6 weight percent gas atomized zinc alloy particles (500 ppm In and 500 ppm Bi) of size −200 mesh or smaller, and 94 weight percent gas atomized zinc alloy particles (300 ppm In and 300 ppm Bi) between 150 and 200 mesh size.

In each of the following tests, four individual batteries were tested.

| Example 3 test results: | 3A | 3B |
|---|---|---|
| Continuous 3.9 ohm load test | | |
| Hours to 1.0 volts | 4.86 | 4.98 |
| Hours to 0.8 volts | 5.36 | 5.68 |
| One watt continuous load test | | |
| Hours to 1.0 volts | 0.75 | 0.79 |
| Hours to 0.8 volts | 1.03 | 1.063 |
| High current pulse test | | |
| Pulses to 1.0 volts | 188.8 | 235 |
| Pulses to 0.8 volts | 455 | 458 |

EXAMPLE 4

Cylindrical alkaline batteries of Type AAAA were built with gel anodes having the following two compositions to test the effect of zinc-based particles in the form of fines (the composition values listed are in percent by weight):

| Composition | 4A | 4B |
|---|---|---|
| Zinc alloy particles | 70.00 | 70.00 |
| Indium acetate (42% Indium) | 0.04 | 0.04 |
| Phosphate ester (6% concentration) | 0.06 | 0.06 |
| Polyacrylic acid | 0.51 | 0.51 |
| Electrolyte solution | 29.39 | 29.39 |

-continued

| Composition | 4A | 4B |
|---|---|---|
| (2% ZnO, 35% KOH) | | |
| Total: | 100.00 | 100.00 |
| Particle sieve size | −20/+200 | −200 |
| Average particle size | 335 microns | 86 microns |

The above compositions were prepared by first mixing the indium acetate powder with the dry zinc alloy particles. Next, phosphate ester was applied, followed by the polyacrylic acid. After blending and crushing any lumps, the electrolyte solution was added and the mixture was blended until uniform. The zinc alloy particles in both 4A and 4B included 150 ppm In and 200 ppm Bi.

In each of the following tests, four individual batteries were tested.

| Example 4 test results: | 4A | 4B |
|---|---|---|
| Continuous 30 ohm load test | | |
| Hours to 1.0 volts | 11.9 | 11.9 |
| Hours to 0.9 volts | 12.7 | 12.7 |
| Hours to 0.8 volts | 13.7 | 13.8 |
| 0.25 watt continuous load test | | |
| Hours to 1.0 volts | 0.72 | 0.85 |
| Hours to 0.9 volts | 0.78 | 0.89 |
| Hours to 0.8 volts | 0.79 | 0.90 |
| High current pulse test (hours) | | |
| Pulses to 1.0 volts | 0.97 | 1.43 |
| Pulses to 0.9 volts | 1.66 | 1.90 |

Very small zinc-based particles, such as fines and dust, tend to be more unstable in oxygen-rich environments than larger particles and must therefore be processed with due care. Such issues, together with physical bulk handling issues of powders and fines, may need to be considered when determining the absolute minimum practical particle size for production anodes.

Other embodiments are also within the scope of the following claims.

What is claimed is:

1. A negative electrode for an electrochemical cell, comprising zinc alloy particles suspended in a fluid medium, at least about 6 percent, by weight, of the zinc alloy particles being of −325 mesh size or smaller.

2. The negative electrode of claim 1, wherein at least about 10 percent, by weight, of the zinc alloy particles are of −200 mesh size or smaller.

3. The negative electrode of claim 1, wherein at least about 25 percent, by weight, of the zinc alloy particles are of −200 mesh size or smaller.

4. The negative electrode of claim 1 further including a surfactant.

5. The negative electrode of claim 1, wherein the zinc alloy particles include a plating material from the group consisting of indium and bismuth.

6. The negative electrode of claim 1, wherein at least about 25 percent, by weight, of the zinc alloy particles are between about 20 and 200 mesh size.

7. The negative electrode of claim 6, wherein at least about 50 percent, by weight, of the zinc alloy particles are between about 20 and 200 mesh size.

8. The negative electrode of claim 1 wherein the zinc alloy particles are generally acicular, having a length along a major axis at least two times a length along a minor axis.

9. The negative electrode of claim 1 wherein the zinc alloy particles are generally flakes, each flake generally having a thickness of no more than about 20 percent of the maximum linear dimension of the particle.

10. A primary electrochemical cell having a cathode, an anode comprising zinc alloy particles suspended in a fluid medium, at least 6 percent, by weight, of the zinc-based particles being of −325 mesh size or smaller, and a separator between the cathode and the anode.

11. The primary electrochemical cell of claim 10, wherein at least about 10 percent, by weight, of the zinc alloy particles are of −200 mesh size or smaller.

12. The primary electrochemical cell of claim 11, wherein at least about 25 percent, by weight, of the zinc alloy particles are of 200 mesh size or smaller.

13. The negative electrode of claim 1, wherein the zinc alloy particle comprises indium and/or bismuth.

14. The primary electrochemical cell of claim 10, wherein the zinc alloy particles comprise indium and/or bismuth.

* * * * *